July 6, 1937. W. E. BURNS 2,086,116
CAN TESTER
Filed Oct. 1, 1934 5 Sheets-Sheet 2

INVENTOR
WILFORD E. BURNS
BY
Cook & Robinson
ATTORNEY

July 6, 1937.  W. E. BURNS  2,086,116
CAN TESTER
Filed Oct. 1, 1934   5 Sheets-Sheet 5

INVENTOR
WILFORD E. BURNS
BY
Cook & Robinson
ATTORNEY

Patented July 6, 1937

2,086,116

UNITED STATES PATENT OFFICE 2,086,116

CAN TESTER

Wilford E. Burns, Burlingame, Calif., assignor to M. J. B. Co.

Application October 1, 1934, Serial No. 746,292

4 Claims. (Cl. 73—51)

This invention relates to improvements in can testing devices, and it has reference more particularly to machines of that character whereby tin cans are tested for leaks prior to their being filled; it being the principal object of the invention to provide a machine whereby cans, each with one end thereof permanently closed, may be tested with accuracy and rapidity and whereby the presence in a can of a defect that would permit an undesirable or detrimental leak may be detected.

Generally stated, the present invention resides in the provision of a testing mechanism of the above stated character comprising a plurality of testing chambers wherein the cans are individually disposed and sealed for purpose of making a test thereof; the chambers being slightly larger than the cans and adapted to seal the cans therein in a manner whereby the volume inside each can is sealed from the volume of the enclosing chamber that surrounds the can. Also, means is provided for applying air under pressure to the interior of the cans when so sealed and other means is provided to visibly indicate the building up of any air pressure in the chamber enclosure at the outside of the can that would result from leakage of air thereinto from the inside of the can by reason of any defect on the can wall such as a pin hole leak or defective seam.

More specifically stated, the objects of the present invention reside in the provision of a testing machine of the above stated character, comprising a horizontal table that is revoluble about a central axis and on which table, at established intervals are means for accurately locating the cans in position for testing, and wherein testing bells are supported above the table and in alinement with each of the said locating means and are each reciprocally movable toward and from the table, first to enclose and seal a can therein for testing, then, after a predetermined interval during which the testing operation is effected, to uncover the tested can for its removal from the machine.

It is also an object of this invention to provide means whereby the movement of a bell to a position for enclosing a can, not only seals the chamber but also seals the can, thus to provide separate sealed compartments inside and outside of the can.

Another object of the invention is to provide novel valve mechanisms, operable automatically incident to rotation of the table, to effect an application of air under pressure to the cans after being sealed in the bell chambers and to provide for relief of air from the chambers surrounding the cans during the periods of application of air pressure to the inside, then, after the periods of inflation of the cans by reason of application of air pressure thereto, to seal the outer chambers against escape of pressure to atmosphere and subsequently to open a channel from the outer chambers to a bubble test instrument to indicate whether or not a pressure had been built up by leakage from the inside to the chamber outside the can.

Still other objects reside in the provision of means whereby movements of the testing bells between raised and lowered positions for sealing the cans, are automatically effected in timing with and incident to rotatable advance movements of the table.

Other objects of the invention reside in the details of construction and combination of the various parts and in their mode of operation, as will hereinafter be fully described.

In accomplishing these and other objects of the invention, I have provided the improved details of construction, the preferred forms of which are illustrated in the accompanying drawings, wherein—

Referring more in detail to the drawings:—

Figures 1, 2:
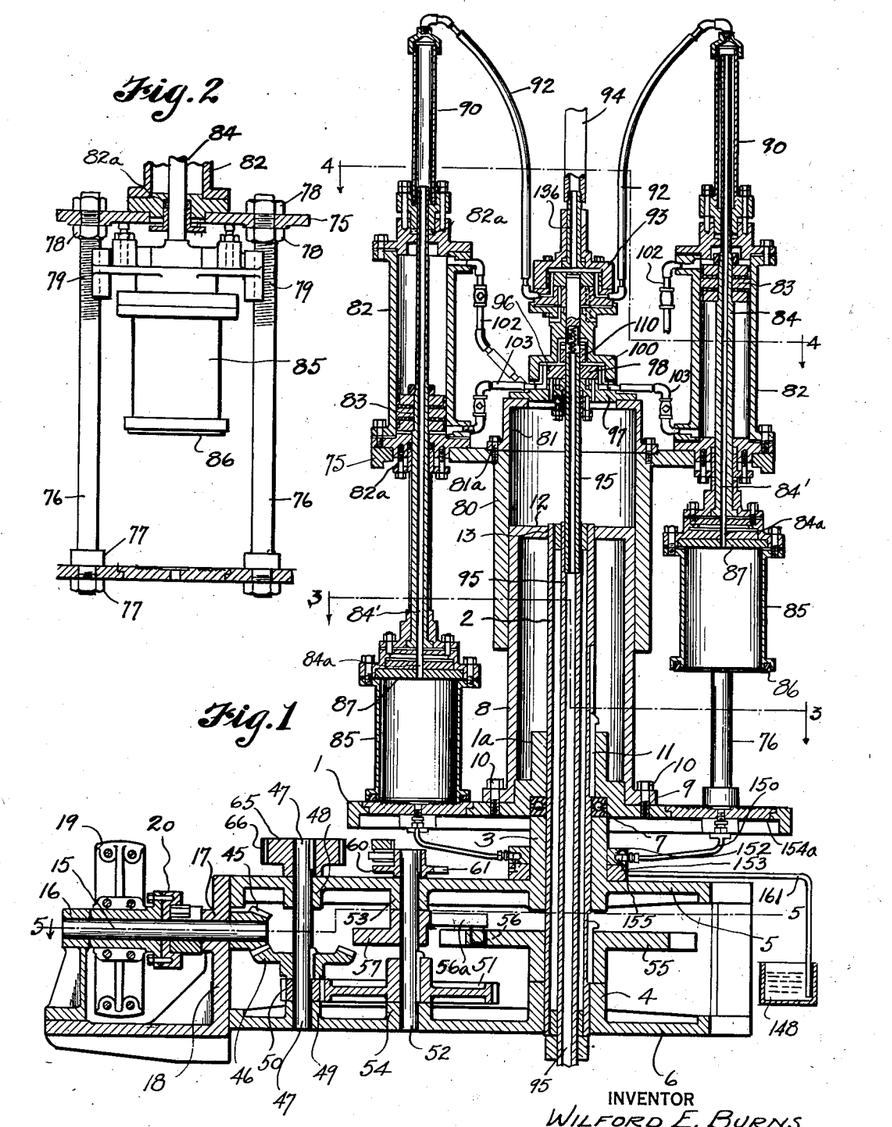
Fig. 1 is a sectional view of the testing machine as seen in a vertical plane through the axis of the machine and illustrating one of the testing bells in raised position.
Fig. 2 is a sectional detail, on line 2—2 in Fig. 3, illustrating the means provided for making certain adjustments to accommodate cans of different height.

1 designates the horizontally disposed, circular, testing table and 2 is a vertically extending, tubular shaft which supports and rotates the table. The tubular shaft, as seen in Fig. 1, is revoluble in bearings 3 and 4 formed integral with the spaced upper and lower walls 5 and 6 of a housing in which gearing, presently described, is contained for intermittently rotating the table. A ball bearing assembly 7 is interposed between the upper end of the bearing 3 and hub of table 1 to carry the weight of the table 1 and of the mechanism located thereon.

Located upon the table, concentrically thereof, is a tubular post 8 having a base flange 9 through which bolts 10 are extended into the table to fix it rigidly in place thereon. The table 1 also has an upwardly formed hub portion 1a that is enclosed in the lower end of the post and to which hub portion the shaft 2 is fixed against rotation therein by a key 11.

The upper end of the post 8 is closed by a horizontal wall 12 and this has a central opening 13 in which the upper end of shaft 2 terminates to add strength and rigidity to the table support.

When the machine is in operation, the table 1 is rotated by intermittent, rotative movements each of which, for the present construction, advances the table an interval of sixty degrees. This definite movement is by reason of the fact that the table has six equally spaced testing stations thereon.

Figure 5:
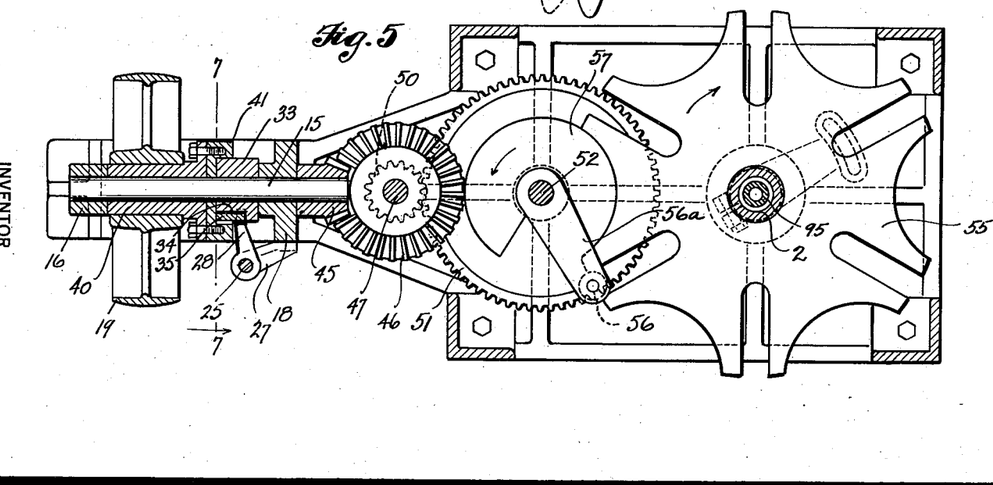
Fig. 5 is a plan view of the turret driving gearing with some parts in horizontal section.
Figure 6:
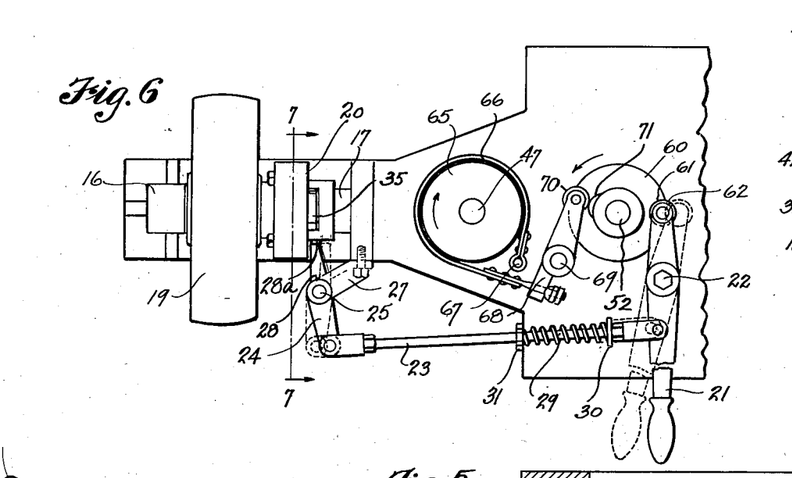
Fig. 6 is a plan view of the clutch and brake mechanism.

The driving gearing for the machine is best shown in Figs. 1, 5, 6, and 7, wherein 15 designates a horizontal, driving shaft revoluble in supporting bearings 16 and 17 fixed to or formed as a part of a bracket 18 at one end of the gear housing. This shaft is equipped with a pulley wheel 19 over which a belt may be extended for driving the shaft. The pulley wheel may run free on the shaft when the machine is out of gear and it is designed to be operatively connected to drive the shaft and operate the machine through the mediacy of a clutch mechanism 20, presently described in detail. The machine is operated under control of a hand lever 21 which is disposed horizontally above the gear housing and is pivotally supported thereon by a pivot bolt 22 extended through the lever at a point between its ends. The lever is operatively connected by a rod 23 with a crank arm 24 fixed to the upper end of a vertical shaft 25 revoluble in a supporting bearing 27 that is bolted to the bracket 18 as seen in Fig. 6. The shaft 25 has a clutch release finger 28 fixed thereto for releasing the clutch, as presently described, and a coiled spring 29 surrounds a part of the rod 23 and is held under compression between an abutment 30 on the rod and a rod guide 31 fixed to the gear housing. This spring, held under compression, operates normally to hold the lever at a position whereby the clutch is released, however, by manual movement of the lever 21 from the full line position to the dotted line position as seen in Fig. 6, the shaft 25 will be rotated in a manner whereby to move the clutch finger 28 to release the clutch for driving the machine.

Figure 7:
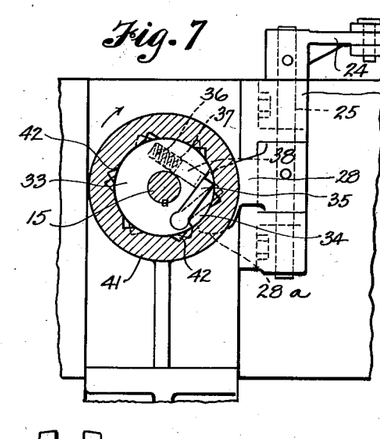
Fig. 7 is a cross section through the clutch device, as seen on line 7—7 in Figs. 5 or 6.

The construction of the clutch is shown in Figs. 5 and 7 wherein 33 designates a circular collar that is keyed on shaft 15 and is provided at one side with a recess 34 in which a flat pawl 35 is pivotally mounted. A coiled spring 36 is located in a bore 37 to press outwardly on a slide 38 which, in turn, bears against the pawl 35 to urge it outwardly as from the full line to the dotted line position shown in Fig. 7. The pulley wheel 19 is keyed on a sleeve 40 that revolves on shaft 15. At one end the sleeve mounts a collar 41 that encloses and revolves on the collar 33. The collar 41, as seen in Fig. 7, has notches 42 in its inner surface adapted to receive the outer end of the pawl to effect a driving connection between the two collars 33 and 41 and thus provide a driving connection for the machine from the pulley wheel through shaft 15. The pawl is of substantial width and is partially uncovered by the collar 41 and the trip finger 28 extends to a position adjacent the collar 33 and has an arcuate portion 28a that may be caused to engage the pawl and displace it from driving connection with collar 41. When the trip finger 28 is actuated to the dotted line position of Fig. 6, it releases the pawl and the driving connection may then be established by reason of spring 36 pushing the pawl outwardly for seating in a notch 42 of the driving collar 41.

On the inner end of shaft 15 is a bevel gear pinion 45 in driving mesh with a bevel gear 46 keyed on a vertical shaft 47 revoluble in bearings 48 and 49 in the top and bottom walls of the gear housing. Keyed on the shaft 47 below gear 46 is a pinion 50 meshing with and driving a larger gear 51 keyed on a vertical shaft 52 revoluble in bearings 53 and 54 in the upper and lower walls of the gear housing.

Keyed on the tubular shaft 2 within the gear housing is a Geneva gear 55 with which a stud 56 on an arm 56a and segment 57 keyed on the shaft 52 co-act to rotatably advance the shaft 2 and table 1 an interval of sixty degrees for each rotation of shaft 52.

In the intended operation, the operator starts the machine by moving the hand lever 21 to the releasing position, as in dotted lines in Fig. 6. This removes the finger 28a from the pawl 35 and permits the pawl to engage the clutch to drive the machine which is automatically stopped after the table has advanced one-sixth of a revolution as will now be described.

By reference to Figs. 1 and 6, it is observed that a circular cam 60 is fixed on the upper end of shaft 52 and this is provided at one side with a semi-circular, peripheral recess 61 adapted to seat therein a roller 62 mounted on the inner end portion of the starting lever 21. When the lever 21 is actuated so as to start the machine, the roller 62 is unseated from the notch 61 and during the following rotation of the cam, it rides upon the periphery of the cam and thus the lever 21 is held in its starting position until the cam 60 has completed one revolution. Then the roller 62 is again seated in recess 61 under action of the spring 29. The trip finger 28 is simultaneously returned to position to engage pawl 35 to release the clutch to stop the driving operation.

Operating in conjunction with the clutch is a brake mechanism comprising a brake drum 65 fixed on the upper end of shaft 47 and a brake band 66 applied thereto. One end of the band is held by a post 67 fixed in the top wall of the gear housing and its other end is adjustably attached to one end of a brake lever 68 that is pivotally mounted on the housing by a pivot stud 69. This lever has a roller 70 at one end in rolling contact with the surface of a cam 71 formed on the hub portion of the cam disc 60. The cam 71 is designed to actuate the lever 68 to effect a braking action of the band 66 on the drum to stop the machine at the end of each rotative action of the table and just as the clutch 20 is disengaged by the movement of lever 21 permitted when roller 62 again seats itself within the cam recess 61. The two cams 60 and 71 are so related that when the brake is applied to check the travel of the machine, it will be released just as the roller 62 moves into the seat 61.

Supported above the table, to revolve therewith is a circular frame 75 whereby the various testing bells and their operating devices are supported. This frame is supported at a definite elevation by means of a plurality of posts 76 which, as seen in Fig. 2, have their lower ends fixed by nuts 77 in the table 1 and their upper ends fixed by nuts 78 in the frame 75. The upper ends of the posts are threaded as at 79 for adjustment of the nuts therealong, thus to change the elevation of the frame and parts thereon relative to the table as a means of adjustment in accommodating cans of different height, as presently understood. This frame includes a depending cylindrical hub portion 80 that fits telescopically over the post 8 on the table 1. Concentrically mounted on the frame 75 is a base 81 for the support of valve devices presently described. This base 81 is fixed to the frame by bolts 81a, as seen in Fig. 1.

Figures 9, 11, 12:
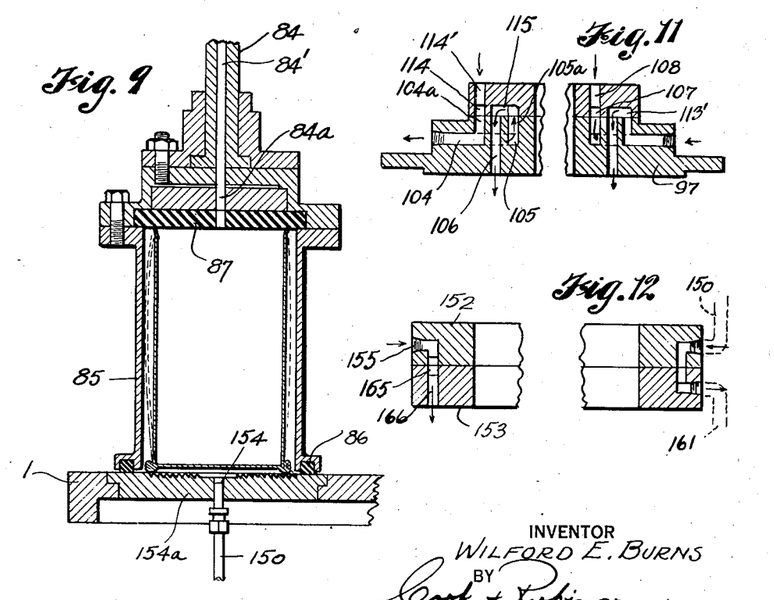
Fig. 9 is a central cross section of a testing bell with a can sealed therein for testing.
Fig. 11 is a cross sectional detail of the valve mechanism for applying air to the cylinders to raise and lower the testing bells.
Fig. 12 is a cross sectional detail of the valve for releasing air pressure to the bubble testing device.
Figure 13:
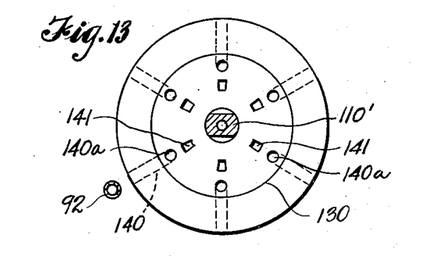
Figs. 13 and 13a, respectively, show in top plan view, the rotating and stationary members of the valve for controlling application of the testing air to the cans.
Figure 13A:
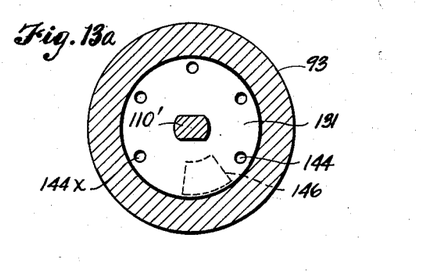

Arranged on the frame 75 at equally spaced intervals and at equal radial distances from the axis of rotation of the table are air cylinders 82, six in number and vertically disposed. Each cylinder contains a piston 83 fixed on a piston rod 84 that extends slidably through the upper and lower end walls of the cylinders; suitable packing being provided about the rod as at 82a to prevent leakage of air pressure from the ends of the cylinders. At their lower ends, each of the piston rods is fixed to the closed upper end of a testing bell 85 which is adapted to be moved upwardly and downwardly in accordance with the action of the piston in the cylinder corresponding thereto, thereby to permit the placing of cans in position on the table for testing, and the enclosing of the cans within the bells when the latter are actuated downwardly thereover. The lower end of each bell is open to permit it to be applied over a can and is provided at the lower end with a peripheral, inset, sealing gasket 86 adapted to be pressed against the table top in an air tight joint. Seated in the upper end of the bell is a rubber base or pad 87 that will be compressed against the open end of the can in an air tight joint when the can is enclosed by the bell for testing; thus, as seen in Fig. 9, the bell will be sealed to outside atmosphere and the can will also be sealed within the bell.

It is to be understood that the testing bells 85 will substantially conform in shape to the cans to be tested and are just slightly greater in diameter and of approximately the same length as the cans so that when they enclose the cans, there will be just a slight space between the can walls and the chamber walls and the air capacity of the bell outside the can is comparatively small.

The piston rods 84 are tubular to provide for the application of testing air to the cans therethrough, and the channel 84' in each rod communicates at its lower end with a channel 84a leading into the bell through its upper end wall and centrally through the rubber pad. The upper ends of the piston rods, above the pistons, are telescopically contained within tubular extensions 90 that are mounted on the upper end walls of the cylinders 84. Flexible pipes 92 are extended from a distributing valve 93, presently described, supported coaxially of the machine, to the upper ends of the extension tubes 90 to supply air to the testing bells through the piston rods, and air to the valve 93 is supplied through a pipe 94.

Figures 8, 10:
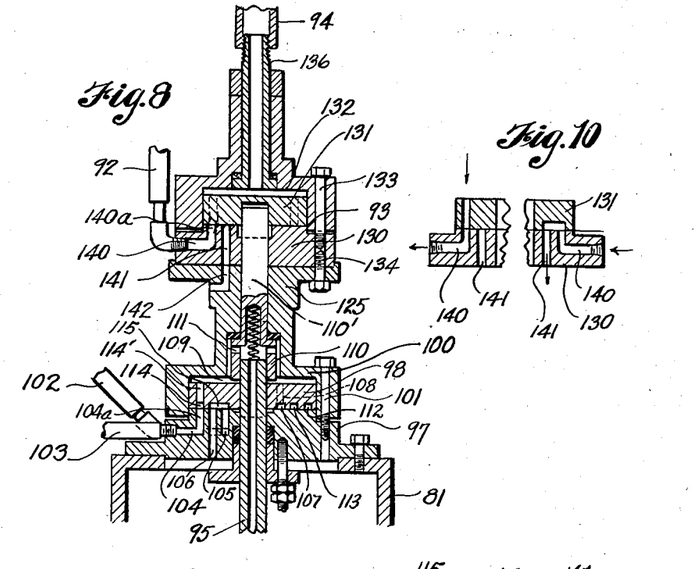
Fig. 8 is a sectional detail axially through the valve mechanisms for controlling application of air for lifting and lowering the testing bells and whereby air pressure is admitted to and released from the cans when sealed in the testing bells.
Fig. 10 is a sectional detail of the valve mechanism for application of testing air to the cans.

Application of air to the various cylinders for effecting movement of the pistons for raising and lowering the testing bells is made through an air supply pipe 95 that extends coaxially within the tubular shaft 2 to a distributing valve supported on the cap 81. This valve mechanism, as disclosed best in Figs. 8, 11, 14, and 14a comprises a rotating base or seat 97 that is fixed upon the cap 81, and a stationary valve member 98 which, as seen in Fig. 14a, is slidably applied to the upper end of the air supply pipe 95 but cannot rotate thereon. The upper surface of the rotating seat is flat, and the valve member 98 is of disc-like form and rests flatly upon the rotary member in an air tight joint. A housing 100 encloses the part 98 and rests upon and is fixed to the base 97 by bolts 101, as shown in Fig. 8. Each of the cylinders 82 has pipe connections 102 and 103 leading from their upper and lower ends, respectively, to the distributing valve 96. The pipes 103 are connected with ports 104 in the rotary base member 97 and the pipes 102 likewise connect with ports 105. The ports 104 are equally spaced apart about the base member 97 and lead radially thereinto, then upwardly to the upper face of the base or seat as indicated by the openings 104a shown in Fig. 14; these several openings being circularly arranged about the axis of rotation of the valve and spaced 60 degrees apart. The ports 105 enter the base 97 angularly and at points that are intermediate the ports 104 and lead inwardly and then open upwardly through the face of the member 97 as designated at 105a in Fig. 14; the arrangement being such that the ports 104a and 105a, which correspond to the same cylinder 82 open to the upper face of valve member 97 in alinement radially of the valve, with the ports 105a all located in a circle concentric of the valve and of lesser diameter than the circle of ports 104a.

Figure 14:
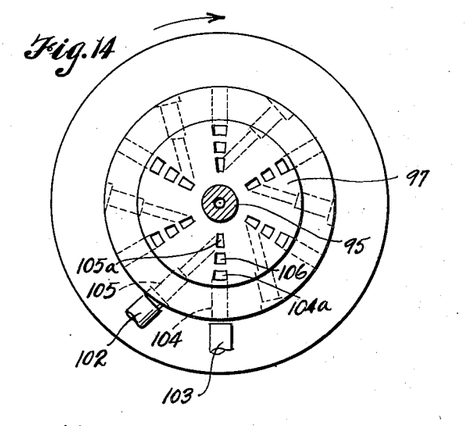
Figs. 14 and 14a, respectively, are the rotating and stationary members of the valve mechanism whereby air is administered to the cylinders for actuating the piston to move the testing bells.
Figure 14A:
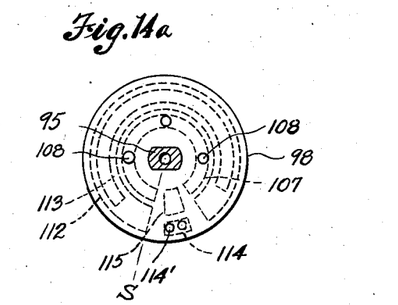

Extended vertically through the valve seat 97 at points intermediate radially alined ports 104a and 105a are exhaust ports 106 and these also are arranged in a circle concentric of the valve; the circular arrangement of ports being shown in Fig. 14.

The stationary valve member 98 is provided on its under surface with a groove or channel 107 directly overlying the circle of ports 105a of member 97 and extending concentrically of the valve member 97 through an arc of approximately 310 degrees, as seen in Fig. 14a, and a plurality of ports 108 open therefrom upwardly through and to the upper face of the part 98.

A clearance space 109, as seen in Fig. 8, is provided in the housing 100 above the valve member 98 and the upper end of air supply pipe 95 terminates in a socketed bushing 110 having ports 111 therein opening laterally and downwardly from the socket to the space 109 thus to provide for communication of air pressure from the pipe 95 to ports 108. The valve member 98 also has concentrically located grooves 112 and 113 in its under surface directly overlying the circle of ports 104a and 106 respectively. These grooves extend through an arc coextensive with the groove 107, and they are joined along their opposite end portions for the last thirty degrees as seen in Fig. 14a. There is also a pocket 114 in the under face of the valve member between the opposite ends of groove 112, spanning an arc of about 20 degrees and overlying the outer circle of ports 104a and there are air ports 114' opening therefrom upwardly through the disk 98 to the air chamber 109. Also, there is a pocket 115 in the under face of the disk 98 radially alined with the pocket 114 and extending across the circle of ports 105a and 106.

For purposes of explanation, the ends of valve channels 107—112 and 113 alined with the radial line "S" in Fig. 14a, will be designated as the starting ends.

Figure 3:
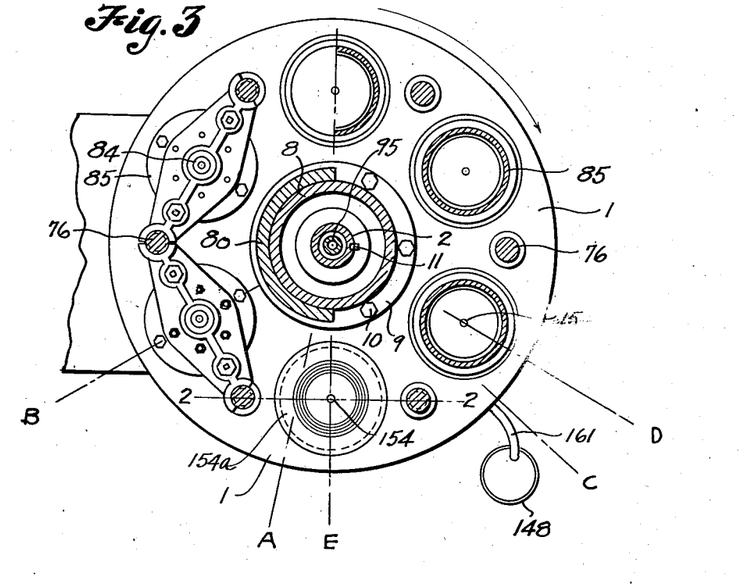
Fig. 3 is a horizontal section of the machine, taken on line 3—3 in Fig. 1.

With the valve parts arranged as in Fig. 8, it is apparent that with part 98 stationary and part 97, as seen in Fig. 14, rotating in a clockwise direction, each set of ports 104a—106 and 105a, will simultaneously pass into registration with the channels 112, 113, and 107, respectively. Air under pressure supplied by pipe 95 to the valve and applied through the ports 108 to the channel 107 is thereby communicated through the port 105 and pipe 102 to the upper end of the corresponding cylinder 82 and the piston 83 in the cylinder will be actuated downwardly to move the corresponding testing bell 85 downwardly to enclose and seal a can placed on the table below it in position for testing. As the piston in the cylinder is driven down, air is exhausted from the lower end of the cylinder through pipe 103, valve port 104, valve grooves 112, 113 and valve ports 106. The bell is thus retained in lowered position while the table rotatably advances through an arc corresponding to the extent of groove 107. When the ports 105a and 106 finally pass from registration with the grooves 107 and 113, they then are brought simultaneously into communication with the pocket 115. At the same time the port 104a will pass into registration with pocket 114 and air is supplied through ports 114', 104 and pipe 103 to the lower end of the cylinder 85 to actuate the piston upwardly to raise the bell, and air is exhausted from the upper end of the cylinder through the pipe 102, port 105, pocket 115 and exhaust ports 106. The arrangement of parts is such that, with respect to the plan of the device as seen in Fig. 3 and with the machine rotating in the direction of the arrow; the bells 85 are actuated downwardly as they travel along the arc between radial lines A and B and they are lifted for removal of the tested can when they reach the radial line C. Testing is done at the station alined with radial line D and cans are applied at the station alined with radial line E, designated as the operator's station.

When a can is placed in position on the table 1 for testing at station E, it is accurately alined with the axial line of travel of the testing bell which is to enclose it. When the bell is lowered, it encloses the can, as seen in Fig. 9 with the top or open end of the can pressed in an air tight joint against the rubber pad 87 thus to seal the can. At the same time, the bell is sealed at its lower end by contact of the gasket 86 with the table top. Air is then administered to the inside of the sealed can through the tubular piston rod 84 under control of the previously mentioned valve mechanism 93.

The valve mechanism 93, as seen in Figs. 8, 10, 13 and 13a, comprises a base housing 125 formed integral with the top housing 100 enclosing the lower valve 96. On this base 125 is disposed the rotary base member 130 which rotates about a spindle-like extension 110' of the bushing 110. Fitted upon the rotary base 130 is a stationary valve disk 131 that is enclosed within a housing portion 132 fixed by bolts 133 to the base 130 which in turn is fastened by bolts 134 to the upper part of support 125. Air is admitted under pressure to the upper face of valve member 131 through a pipe 136 which connects with pipe 94. The pipe 136, in this arrangement is coaxial of the valve, and is held against rotation by its connection with pipe 94.

The valve base 130 has ports 140, equally spaced and leading radially thereinto. The pipes 92 for supplying air to the various testing bells, connect with the outer ends of these ports and the inner ends of the ports open inwardly through the face of the member 130 in equal spacing and in circular arrangement about the central axis of the valve; the upper ends of the ports being designated by 140a in Fig. 13. There are exhaust ports 141 opening directly through the valve member 130 in radial alinement with the ports 140a and arranged concentrically about the axis of rotation in a circle that lies within the circle of ports 140a. The lower ends of the ports 141 are designed to register with ports 142 leading to atmosphere through the support 125 as seen in Fig. 8, when the valve is at rest.

The upper valve member 131 is held against rotation by a keyed connection with the upper end extension 110' of the bushing 110 and it fits against the flat upper face of part 130 in an air tight joint. The member 131 has five ports 144 directly therethrough at an angular spacing of sixty degrees and adapted to register with the corresponding ports 140a at periods of rest of the valve, however, at the sixth station corresponding to the operator's station there is no port 144 but there is a recess or pocket 146 in the under surface of the part 131 adapted to provide a connection between the paired ports 140a and 141, when they are moving to this station, thereby to exhaust air from the sealed can in the bell corresponding thereto prior to raising of the bell under control of valve 96. Thus, assuming that a can is sealed in a bell, as seen in Fig. 9, air will be admitted under pressure to the can when the corresponding port 140 in valve base 130, rotating clockwise with respect to its showing in Fig. 13, passes into registration beneath that port of the member 131 designated as 144x in Fig. 13a. This pressure is maintained while the table advances through five successive stations by reason of the fact that at the end of each advance movement the port 140 again registers with a port 144. When the table leaves the testing station, the pocket 146 in the valve member 131 provides a connection between the ports 140 and 144 and thus the air in the can is exhausted to atmosphere while additional air is cut off, during the time the cylinder is raised at the operator's station.

Figure 4:
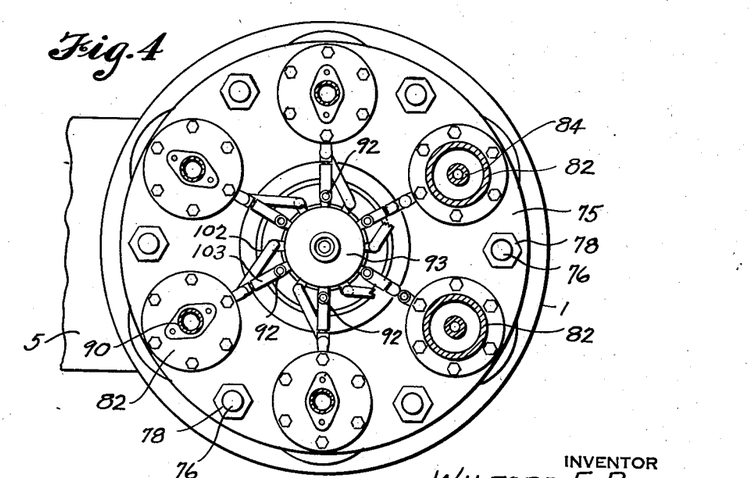
Fig. 4 is a horizontal section on line 4—4 in Fig. 1.

With reference to the location of parts, as seen in Fig. 4, air is applied interiorly of the cans as the bells reach the station on radial line B and continues until they reach station D.

If a can under test has any defect which will permit of a leak, air pressure applied interiorly thereto will leak to the outside of the can and consequently build up a pressure in the sealed space between the can and chamber walls. In order that any pressure thus built up may be visibly indicated, I have provided means for making an air connection between this sealed space and a liquid containing vessel 148 to indicate, by a bubble test, the fact that there is a leak. This connection is automatically made by a valve mechanism, incident to rotation of the machine and the connection takes place when each bell containing the can to be tested reaches the testing station designated at D, in Fig. 3.

Figure 15:
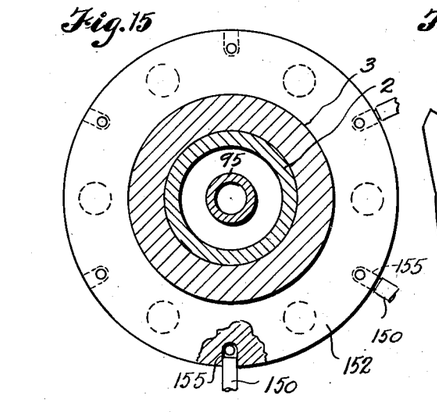
Figs. 15 and 15a, respectively, are the rotating and stationary members of the valve device whereby connection is made between the testing bells and bubble test device.
Figure 15A:
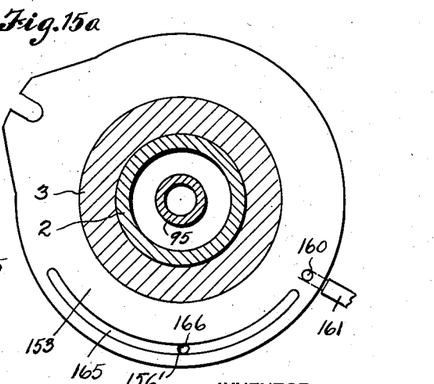

By reference to Figs. 1 and 9, it will be observed that air pipes 150 lead from the various can stations of the table 1 to a valve ring 152 fitted revolubly about the bearing 3 upon a stationary valve base 153. The outer ends of the pipes 150 communicate with ports 154 drilled through base plates 154a inset in base 1, on which the cans are placed for testing and the inner ends of these pipes are threaded into radial ports 155 in the valve ring 152. These ports 155, as seen in Fig. 15, open downwardly from the member 152 in equal spacing and in a circle concentric of the axis of rotation, and are adapted, on rotation of the ring 152, to successively be brought into registration with an exhaust port 160, alined with the station D, and from which port a pipe 161 leads into the open testing vessel 148. The pipe enters the base of the vessel and thus when a port 155 stops in registration with port 160, any air pressure in the chamber surrounding the can, will be exhausted through pipe 161 and the presence of a leak in the can will be indicated by the discharge of air bubbles into the liquid in the testing vessel.

In order that the slight inflation of each can that occurs when the can receives the testing air pressure will not operate to build up a pressure in the chamber surrounding the can, I have provided an arcuate slot 165 in the valve disk 153 and this extends concentric of the valve through an arc from slightly beyond the testing station to the first station beyond the operator's position. This slot communicates with an exhaust port 166. Thus, the chamber surrounding the can is open to atmosphere until after the can has received the testing air.

The present machine may readily be applied to the testing of cans of different size and shape by a change of testing bells, and adjustment of parts that is provided for. Also, square, or oblong cans may be accommodated the same as cylindrical cans.

Having thus described my invention, what I claim as new therein and desire to secure by Letters Patent is:

1. In a can testing machine, a rotary base provided with stations at which open end cans may be mounted in upright position for testing, testing bells associated with the base and having open lower ends for receiving the cans, means operable incident to rotary advancement of the base to effect the movement of the bells to enclose the cans and into sealing contact with the base, means in the bells for sealing the open ends of the cans incident to sealing of the bells, means timed with the sealing of the cans to admit testing air under pressure thereinto, an air leak indicator, a valve mechanism, conduits connecting the bells with the valve mechanism and a conduit connecting the valve mechanism and indicator; said valve mechanism comprising a part rotating with the base and operable during the inflation period of each can to open its enclosing bell to atmosphere then to close the bell for a definite period and subsequently to connect the bell with the leak indicator.

2. In a can testing machine, a rotatably mounted base with stations at definite intervals for the support of open end cans in upright positions for testing, air cylinders supported above the base to rotate therewith, a piston for each cylinder having a tubular rod extended from opposite ends of its cylinder, a testing bell attached to each rod, a source of air under pressure, valve mechanism connected therewith and with each of the cylinders and operable in timing with rotation of the base for admitting air to the cylinders to actuate the pistons to move the bells against the base thereby to enclose and seal the cans thereon during a predetermined interval of travel, other valve mechanism connected with a source of air pressure and with the said bells through the tubular piston rods and operable in timing with the can sealing operation for applying testing air directly into the sealed cans, and an air leak indicator, a valve mechanism connected to the indicator and the various bells whereby the bells are open to atmosphere during the initial application of air to the cans, then are closed for an interval and finally opened to the leak indicator.

3. In a can testing machine, an intermittently advancing rotary base, with stations at intervals thereon for the mounting of open end cans in upright position for testing, a plurality of air cylinders supported from the base, a piston and rod for each cylinder, a testing bell attached to each rod, means operable in synchronism with rotation of the base for applying air to the said cylinders for moving the bells to raised positions and for lowering them against the base to enclose and seal cans placed thereon and also to seal the bells against the base about the cans, means operable in timing with the sealing of the cans for applying testing air thereinto, an air leak indicator and a valve mechanism therefor comprising a stationary part having a port opening to atmosphere and a port connected with said indicator, and a member rotating with the base and having ports connected respectively with the bells when sealed about the cans and adapted to communicate with the port to atmosphere during inflation of the can and to connect with the port to the indicator at a later period in the advancement of the base.

4. A can testing machine comprising a support, a base rotatably mounted thereon, and equipped with stations at intervals for the support of cans for testing, means for effecting intermittent advance movements of the base to move the cans by a plurality of advance movements from the loading to the testing station, a standard on the base, air cylinders supported from the standard above each station, a piston and rod for each cylinder, testing bells attached to the piston rods, means operable incident to advancement of the base to effect application of pressure medium successively to the cylinders to actuate the bells to raised position, as they advance from the testing station to the loading station, and for lowering them against the base as they move from the loading station thereby to seal the bell and can enclosed therein, means operable in timing with the sealing of each can for applying testing air thereto, an air leak indicator and a valve mechanism whereby the sealed bells are connected to atmosphere during the inflation period of the can sealed therein, and are then closed during advancement to the testing station and are then opened to the air leak indicator.

WILFORD E. BURNS.